US005604336A

United States Patent [19]
Johnson

[11] Patent Number: 5,604,336
[45] Date of Patent: Feb. 18, 1997

[54] LOAD CELL WITH COMPOSITE END BEAMS HAVING PORTIONS WITH DIFFERENT ELASTIC MODULUS

[75] Inventor: Thomas H. Johnson, Winnebago, Minn.

[73] Assignee: Weigh-Tronix, Inc., Fairmont, Minn.

[21] Appl. No.: 400,680

[22] Filed: Mar. 8, 1995

[51] Int. Cl.⁶ .................................................. G01G 3/08
[52] U.S. Cl. .................... 177/229; 73/862.637
[58] Field of Search ...................... 177/184, 187, 177/229, 230; 73/862.637, 862.638

[56] References Cited

U.S. PATENT DOCUMENTS

| | | | |
|---|---|---|---|
| 3,161,046 | 12/1964 | Farley | 177/229 |
| 3,470,400 | 9/1969 | Weisbord | 177/229 |
| 3,685,604 | 8/1972 | Smith et al. | 177/229 |
| 3,742,418 | 6/1973 | Randolph, Jr. | 177/229 |
| 4,043,412 | 8/1977 | Rock | 177/229 |
| 4,064,744 | 12/1977 | Kistler | 177/229 |
| 4,065,962 | 1/1978 | Shoberg | 177/229 X |
| 4,107,985 | 8/1978 | Sommer | 177/229 |
| 4,237,989 | 12/1980 | Lewis | 177/229 |
| 4,321,500 | 3/1982 | Paros et al. | 177/229 |
| 4,362,961 | 12/1982 | Gerber | 177/229 |
| 4,372,173 | 2/1983 | EerNisse et al. | 177/229 |
| 4,384,495 | 5/1983 | Paros | 177/229 |
| 4,406,966 | 9/1983 | Paros | 177/229 |
| 4,415,827 | 11/1983 | Chuang | 177/229 |
| 4,429,248 | 1/1984 | Chuang | 177/229 |
| 4,445,065 | 4/1984 | Albert | 177/229 |
| 4,446,394 | 5/1984 | Albert | 177/229 |
| 4,448,546 | 5/1984 | Paros | 177/229 |
| 4,454,770 | 6/1984 | Kistler | 177/229 |
| 4,459,042 | 7/1984 | Paros | 177/229 |
| 4,469,979 | 9/1984 | Chuang | 177/229 |
| 4,540,057 | 9/1985 | Freeman | 177/229 X |
| 4,583,607 | 4/1986 | Freeman | 177/229 X |
| 4,592,663 | 6/1986 | EerNisse et al. | 177/229 |
| 4,611,677 | 9/1986 | Yu | 177/229 |
| 4,623,813 | 11/1986 | Naito et al. | 177/229 |
| 4,655,306 | 4/1987 | Saner | 177/229 |
| 4,656,383 | 4/1987 | Albert | 177/229 |
| 4,657,097 | 4/1987 | Griffen | 177/211 |
| 4,724,351 | 2/1988 | EerNisse et al. | 177/229 |
| 4,838,369 | 6/1989 | Albert | 177/229 |
| 4,872,343 | 10/1989 | Peters et al. | 177/229 |
| 4,912,990 | 3/1990 | Norling | 177/229 |
| 4,929,860 | 5/1990 | Hulsing, II et al. | 177/229 |
| 5,052,505 | 10/1991 | Naito et al. | 177/229 |
| 5,113,698 | 5/1992 | Grjl et al. | 177/229 |
| 5,205,369 | 4/1993 | Neeleman | 177/229 |
| 5,247,840 | 9/1993 | Klämt | 73/862.637 |
| 5,250,762 | 10/1993 | Gustafsson et al. | 177/229 X |
| 5,313,023 | 5/1994 | Johnson | 177/229 |
| 5,336,856 | 8/1994 | Johnson | 177/210 FP |

FOREIGN PATENT DOCUMENTS 096653 5/1983 European Pat. Off. .
1369670 4/1971 United Kingdom .

Primary Examiner—Patrick J. Stanzione
Assistant Examiner—Randy W. Gibson
Attorney, Agent, or Firm—Gray Cary Ware & Freidenrich

[57] ABSTRACT

A composite load cell utilizes end blocks mounted to the ends of a load cell body to increase the apparent bulk modulus of the end beams on the body. The increased modulus of the end beams improves cornering of the load cell, and further aids in the rejection of moment induced shears, including those due to off-center loading, thereby increasing the usable resolution of the load cell.

44 Claims, 3 Drawing Sheets

LOAD CELL WITH COMPOSITE END BEAMS HAVING PORTIONS WITH DIFFERENT ELASTIC MODULUS

FIELD OF THE INVENTION

The invention is generally directed to a load cell for providing an output signal which is indicative of a force applied to the load cell, such as a force that is a result of weight, acceleration, pressure, and the like. More particularly, the invention is directed to a composite load cell having end blocks mounted at the ends of a load cell body to increase the apparent bulk modulus of the load cell and thereby improve cornering and/or reject moment induced shear effects from the output signal of the load cell.

BACKGROUND OF THE INVENTION

Different designs of load cells, i.e., devices for measuring applied force and outputting signals indicative thereof, are known in the art. Load cells may use several different types of force sensors, including strain gauges, vibrating strings, force motors, capacitor sensors, resonating sensors such as piezoelectric quartz crystals and tuning forks, etc., for measuring applied force.

Many load cell designs transfer an applied force to one or more force sensors through a load cell body and other suitable force sensing structure. The load cell bodies of many designs typically include a pair of relatively stiff and massive end beams which are joined to relatively smaller and more flexible connecting beams (e.g., through one or more flexures) which extend between the tops and bottoms of the end beams, thereby forming a generally rectangular block having an aperture defined therein. Typically, force sensing structure including one or more force sensors is disposed within this aperture.

The above-described load cell designs measure force as a function of the shear forces applied across the connecting beams as a result of the relative deflection of the end beams. By selecting a suitable material and design for the load cell body, the force applied to the body may be scaled in such a manner as to provide a reasonable range of shear forces for measurement by the force sensors (e.g., to provide a load cell with a specific capacity).

The proper operation of a shear responsive load cell relies on the assumption that a deflection in the load cell body will be brought about through deflection of the connecting beams through their flexures. It is generally assumed that the end beams, being stiffer and more massive, will not bend or otherwise distort due to an applied force. Otherwise, any distortion or bending of the end beams would induce shear that could result in inaccurate force calculations, primarily due to what is referred to as "moment induced shears." Thus, it is desirable to minimize any distortion or bending of the end beams to reduce any extraneous shearing resulting from coupling of the applied force.

It may also be desirable to reject torsional moments which occur as a result of off-center loading (i.e., an applied force which is off-axis from the load cell). Rejection or compensation of torsional moments typically requires the individual flexures joining the connecting beams to the end beams to be specifically adjusted (e.g., by removing material from the flexures).

The end beams of conventional load cells are typically made stiffer by increasing their size (e.g., by increasing their width). However, I have found that the stiffness of the end beams is limited by the inherent bulk modulus of the material used for the end beams, and therefore, there is a limit to which simple dimensional modifications will stiffen the end beams. Consequently, many conventional designs are limited in the degree of cornering and moment induced shear rejection that can be obtained, thereby limiting the usable resolution of these designs.

Therefore, a need exists in the art for a load cell having improved cornering and rejection of moment induced shears, and which is not limited by the bulk modulus of the material in the load cell body.

SUMMARY OF THE INVENTION

The invention addresses these and other problems associated with the prior art by providing a composite load cell which utilizes end blocks mounted to the ends of the load cell body that have a higher modulus than the end beams on the load cell body. By securely mounting the load cell body through relatively stiffer end blocks, the apparent bulk modulus of the end beams increases to improve cornering and better reject moment induced shears in the load cell.

Therefore, in accordance with one aspect of the invention, there is provided a force sensing composite load cell which includes a load cell body including first and second opposing end beams, the load cell body adapted to deflect in response to an applied force; and first and second end blocks, respectively mounted to the first and second end beams and constructed from a material having a bulk modulus which is greater than that of the end beams.

According to a further aspect of the invention, a force sensing composite load cell is provided which includes a load cell body having first and second end beams joined by at least one connecting beam, the end beams being adapted to provide a relative deflection due to applied force on the load cell body, and being constructed from a material having a first elastic modulus; sensing means for sensing shear force applied to the load cell body by the relative deflection of the end beams; and first and second end blocks, mounted to the end beams and constructed from a material having a second elastic modulus, the second modulus being at least about 50 percent greater than the first modulus; whereby the apparent bulk modulus of the end beams is increased.

In accordance with an additional aspect of the invention, a scale is provided, which includes a base; a force receiving member adapted to receive an applied force; a force sensing composite load cell; and mounting means for mounting the composite load cell to the base and the force receiving member; whereby a force applied to the force receiving member is applied across the composite load cell. The composite load cell includes a monolithic load cell body having an interior aperture defined by first and second end beams joined by flexures to first and second connecting beams, the end beams being adapted to provide a relative deflection due to applied force on the load cell body and being comparatively stiffer than the connecting beams, the load cell body being constructed from a material having a first elastic modulus; sensing means, disposed within the interior aperture, for sensing effects due to shear force applied to the connecting beams through the relative deflection of the end beams, the sensing means including a load beam extending from a wall of the interior aperture, a cantilevered beam coupled to and extending generally parallel to the load beam, and a force sensor coupled between the load beam and the cantilevered beam; and first and second end blocks, mounted to the end beams and constructed from a material having a second elastic modulus which is greater than the first modulus of the end beams, for increasing the apparent bulk modulus of the end beams. The composite load cell is mounted to the base and the force receiving member through the first and second end blocks, respectively.

These and other advantages and features, which characterize the invention, are set forth in the claims annexed hereto and forming a further part hereof. However, for a better understanding of the invention, its advantages and objectives attained by its use, reference should be made to the Drawing, and the following descriptive matter, where a preferred embodiment of the invention is described.

DETAILED DESCRIPTION OF THE PREFERRED EMBODIMENTS

Figure 1:
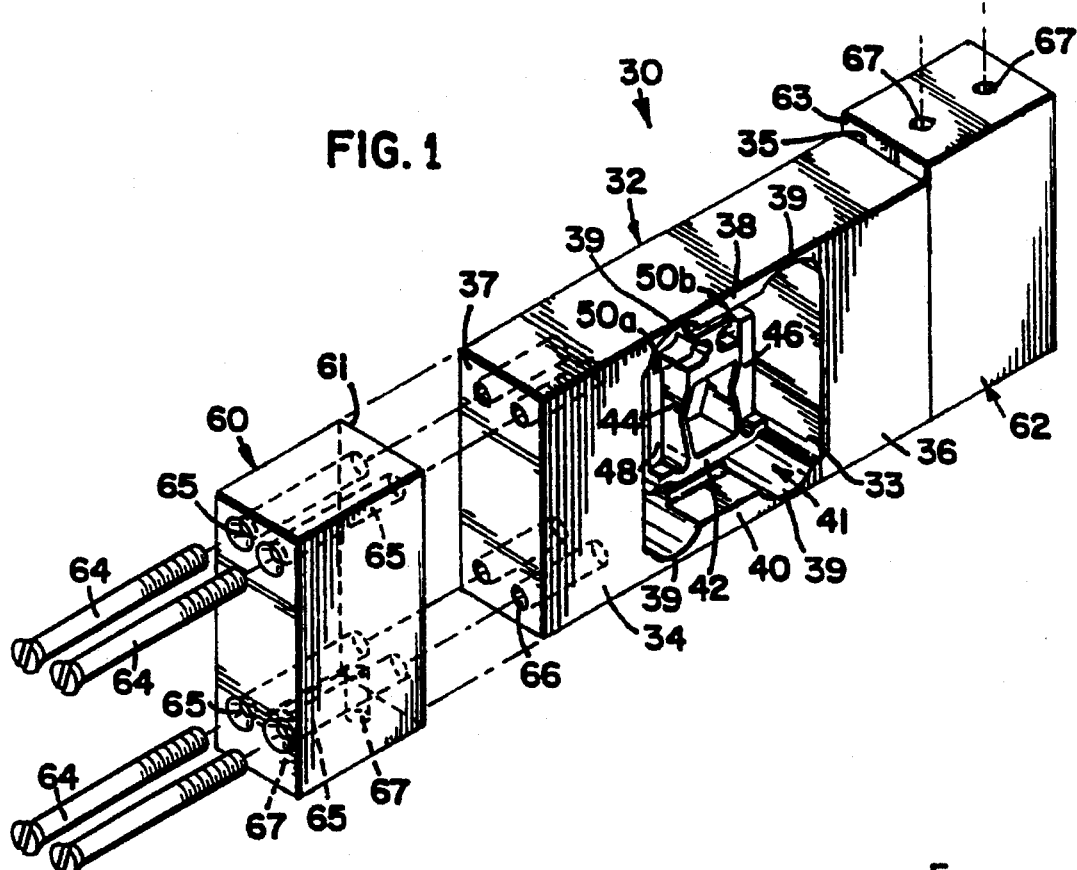
FIG. 1 is a partially exploded perspective view of a composite load cell consistent with the invention.

Turning to the Drawing, wherein like numbers denote like parts throughout the several views, FIG. 1 shows a preferred composite load cell 30 including a load cell body 32 having end beams 34 and 36 joined at the opposing ends thereof to connecting beams 38 and 40 through a plurality of flexures 39, thereby forming an aperture 33 with a force sensing structure 41 disposed therein. It will be appreciated that different force sensing structures may be used in aperture 33 consistent with the invention.

Load cell body 32 is cooperatively attached to a pair of end blocks 60, 62 which are mounted to end surfaces 35, 37 of end beams 34, 36, respectively, with fasteners 64 extending through apertures 65 and into 66. The end blocks 60, 62 are constructed of a higher modulus material than that of end beams 34, 36 of load cell body 32.

Principles of Operation

Figure 2:
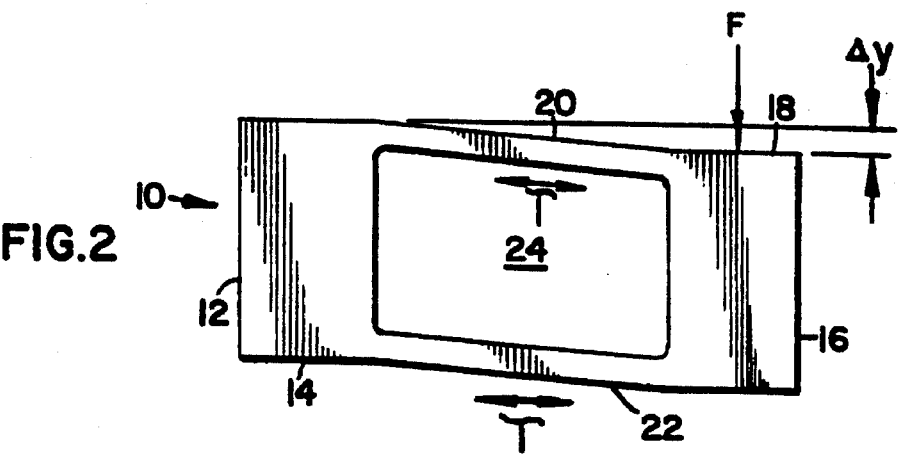
FIG. 2 is a schematic diagram illustrating the principles of operation for a shear responsive load cell.

FIG. 2 is a schematic representation of a typical shear responsive load cell 10, shown subjected to a force F that induces a relative deflection $\Delta y$ between end beams 12 and 16. It will be appreciated that the deflection $\Delta y$ is exaggerated in this figure for ease of illustration.

In load cell 10, the relative deflection between end beams 12 and 16 (e.g., resulting from a force applied perpendicular to top surface 18 of end beam 16 when end beam 12 is mounted at a fixed position at bottom surface 14) results in a shear force, represented by $\tau$, applied to connecting beams 20, 22. The shear force is sensed by the force sensing structure (not shown) that is located within aperture 24 and is converted by appropriate mechanical and/or electrical means (not shown) into an output signal representative of the applied force. It will be appreciated that different types of force sensing structures may be used to measure the shear forces applied to load cell 10, many of which are discussed below.

In a shear responsive load cell such as load cell 10, the force is related to the deflection by the equation:

$$f = k \Delta y$$

where k is a constant that is unique for each particular load cell. The constant k is typically a function of the particular material selected for the load cell, as well as the presence of flexures and other structure that either increase or decrease the ability of a load cell to deflect from an applied force. An increase in the constant k typically increases the capacity of the load cell, while a decrease in k typically increases the resolving power of a cell. Therefore, the constant k is typically used to select a load cell for a particular application to give adequate resolution at a desired capacity.

The total shear force $\tau$ applied to load cell 10 is a function of the shear due to deflection ($\tau_{\Delta y}$) and the shear due to mounting effects ($\tau_m$), generally according to the equation:

$$\tau = \tau_{\Delta y} + \tau_m$$

It is desirable to minimize the mounting effect shear $\tau_m$ to provide a substantially direct relationship between the shear force $\tau$ applied to the force sensors and the deflection $\Delta y$ of the load cell body, which is in turn a direct function of the applied force F.

To minimize the mounting effect shear $\tau_m$, it is important to maximize the stiffness of the end beams. Conventionally, this has been done by making the end beams larger. However, as discussed above, the ability to increase the stiffness of the end beams by dimensional increases is limited by the inherent bulk modulus of the material selected for the end beams, and machining difficulties.

I have found, on the other hand, that the apparent stiffness of the end beams may be increased beyond that obtainable through dimensional changes by mounting end blocks constructed of a higher modulus material to the end beams. As a result, the apparent bulk modulus of the end beam may be increased to further reduce the shear forces due to mounting effects, and consequently provide a more direct relationship between the applied force to the load cell and the shear forces applied to the force sensors.

Load cell Structure

Accordingly, preferred composite load cells consistent with the invention include end blocks which are mounted at ends of a load cell body for increasing the apparent bulk modulus of the end beams on the load cell body. As load cell bodies may be made of various materials having different properties, it will be appreciated that the particular materials and designs for the end blocks will vary depending upon the type and design of load cell body to which the blocks are attached.

One preferred embodiment is shown as load cell body 32 in FIG. 1. This design incorporates end beams 34, 36 which are joined by a plurality of flexures 39 to connecting beams 38 and 40, thereby forming a generally rectangular profile with an interior aperture 33 having force sensing structure 41 disposed therein.

The preferred design of load cell body 32 is used to transmit a force applied thereto to force sensing structure 41 for measurement. It will be appreciated, however, that several modifications may be made to the design of the load cell body consistent with the invention. For example, any number of end beams and connecting beams may be used, e.g., as few as one of each. Moreover, other beam structures or elements which serve similar force transmission functions may be included in preferred embodiments. In addition, one or more flexures may be incorporated as desired to modify the deflection and force transmission characteristics of the preferred load cell body designs. Sensors for sensing shear induced deformations of the beams and flexures may be attached to the beams ether internally or externally such as strain gages or other displacement sensing devises.

Returning to FIG. 1, composite load cell 30 incorporates a pair of force sensitive resonators 50a and 50b which are placed in tension and compression, respectively, by parallel beam structure 41 disposed in aperture 33. Various embodiments of this general design, including several designs which incorporate only one such resonator, are disclosed generally in U.S. Pat. No. 5,313,023 to Thomas H. Johnson and U.S. patent application Ser. No. 08/064,834, filed May 19, 1993, by Thomas H. Johnson et al., both of which are assigned to the assignee of the present invention, and both of which are incorporated by reference herein.

The force sensing structure in load cell body 32 includes a parallel beam structure having a load beam 44 spanning from a base 42 to an opposing side of aperture 33. A pair of cantilevered parallel beams 46, 48 are also mounted to base 42, and a pair of double ended tuning fork resonators 50a, 50b are mounted between the load beam 44 and the cantilevered beams 46, 48, respectively. A relative deflection of end beams 34, 36 applies a shear force through connecting beams 38 and 40 which results in a deflection of cantilevered beams 46, 48 relative to the load beam 44. The deflection of the cantilevered beams places resonators 50a and 50b in tension and compression, respectively, thereby altering the resonant frequency of each resonator.

Using suitable controller electronics (not shown), these resonators may be driven to oscillate at their respective resonant frequencies, whereby the frequency output signals therefrom may be converted to digital form. The value of the force applied to the load cell body may be obtained by taking the difference of the outputs, since the respective resonant frequencies of the resonators will react oppositely to an applied force. By taking the difference of the outputs, many common mode effects, such as due to environmental effects, will be rejected by the subtraction operation.

It has been found that this particular design provides extremely high resolution with reliable rejection of many environmental interferences. Many modifications may be made to this embodiment, including several modifications disclosed in the aforementioned references, including using only one resonator, sealing the aperture with a sealant to protect the force sensors from environmental effects, coating the wire leads from the force sensors with a dampening material, etc.

Figure 5:
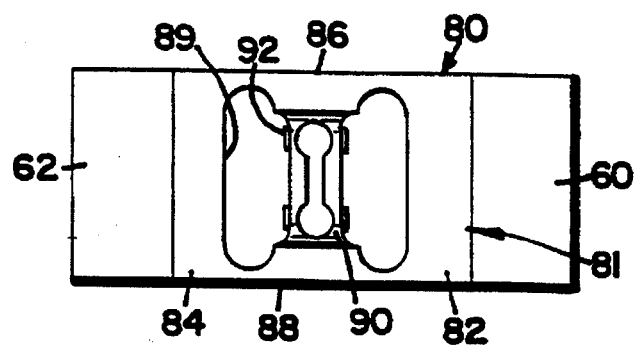
FIG. 5 is a side elevational view of an alternate composite load cell consistent with the invention.

An alternative composite load cell design 80 is shown in FIG. 5, whereby a load cell body 81 includes a pair of end beams 82, 84 joined by connecting beams 86 and 88, and having an aperture 89 which includes a load beam 90 spanning across the aperture. One or more strain gauges 92 are mounted on load beam 90 to measure the shear induced on the load beam through the load cell body. The design of load cell body 81 is one of several suitable embodiments disclosed in U.S. Pat. No. 5,336,854 issued to Thomas H. Johnson, which is assigned to the assignee of the present invention and is incorporated by reference herein to the extent necessary to support this disclosure. Any of the embodiments shown in this reference may be used in a composite load cell consistent with the invention.

Beyond the particular embodiments disclosed herein, the principles of the invention may be applied to any shear responsive load cell design which relies upon relatively stiff end beams for rejecting moment induced shears and/or torsional moments. For example, different strain gauge designs such as shear beams, flexored bending beams (e.g., by Toledo, Revere, BLH, and others), vibrating string designs such as those used to sense shear force (e.g., by K-Tron and others), force motor designs such as those used to sense shear force (e.g., by Sartorius, Metler, A&D, Bizerba, and others), capacitive coupling designs such as those used to sense shear force (e.g., by Setra and others), piezoelectric crystal designs such as those used to sense shear force and tuning fork designs such as those used to sense shear force (e.g., by Ishida and others) are examples of suitable load cell bodies which may be used consistent with the invention.

The preferred load cell bodies may be constructed of many different materials. The load cell bodies may be constructed of a homogeneous material, or alternatively, may include different components formed of different materials.

Preferred compositions for the preferred load cell bodies include metals such as, for example, elemental metals and metal alloys. Metal compounds including aluminum and its alloys such as 2024-T3, 7075-T6, and 1100; copper and its alloys including ASTM B147, ASTM B145, and ASTM B146; zinc and its alloys including ASTM A40A, and ASTM AC41A, as well as any other metals that are known to provide a lightweight structure having good resilience to the forces intended to be sensed by the cell, may be used. Most preferably, metals such as aluminum and its oxides may be used in forming the load cell bodies of the invention but almost any structural material which lends itself to manufacturability may be used.

The load cell body may also be made from polymer or composite systems which provide uniform material characteristics (e.g., modulus, temperature sensitivity, expansion characteristics, etc.). Plastics such as polyamides, polyamide-imides, polyvinyl chloride, polyethylene, propylene, polycarbonates, aminoplasts such as melamine resins, cast epoxy resins, cast acrylics, cast fluoroplastics, phenolics, polyacrylonitriles, cast polyurethanes, cast polyesters or polyolefins, synthetic or natural rubber polymers and copolymers such as silicones; ceramics or ceramic composites such as silicone dioxide; composites such as carbon graphite composites; and cellulosic products; or mixtures of any of these compounds, may be used.

Different materials may be selected based upon the desired capacity, resolution, and/or manufacturability requirements of the finished assembly. It has been found that most of these materials typically have an elastic modulus of between 10 and 30 million psi.

Returning to FIG. 1, composite load cell 30 includes a pair of end blocks 60, 62 mounted to end surfaces 35, 37 of load cell body 32.

Blocks 60 and 62 are preferably a similar profile as that of end beams 34, 36, whereby when they are mounted to body 32, the end blocks generally form an extension of the load cell body. For example, end blocks 60 and 62 include mating surfaces 61, 63 which generally follow the contours of end surfaces 35, 37 to provide a substantially flush junction therebetween, and which preferably match up along at least three edges of the end surfaces.

The longitudinal width of blocks 60, 62 (i.e., the distance in which they extend from end surfaces 35, 37) is preferably at least 50% of the lateral width of the end beams, more preferably at least 100% of the lateral width.

It is preferable to mount blocks 60, 62 such that they are substantially flush with surfaces 35 and 37 on load cell body 32. The blocks are preferably secured to load cell body 32 through a plurality of fasteners such as bolts 64 which extend through apertures 65 in end blocks 60, 62 and which engage threaded apertures 66 that extend into load cell body 32. It will be appreciated that fasteners 64 may also be countersunk to provide flush end surfaces for blocks 60, 62.

It will be appreciated that apertures 65 and 66 may be formed in the end blocks and the load cell body by different known means such as drilling or milling. Moreover, for some materials such as plastics, castable metals, and composites, the apertures may be formed concurrently with the molding or casting of the end blocks or load cell body.

Different manners of mounting the end blocks to the load cell body may also be used in the alternative. For example, other fasteners, such as other numbers and types of bolts, screws, and/or pins may be used. In addition, different mounting methods such as adhesives, welding, soldering, etc., which provide a secure junction between the blocks and the load cell body, may also be used.

End blocks 60, 62 may be constructed of any number of materials, including any of those listed above for the load cell body. However, the particular material chosen for end blocks 60, 62 will vary depending upon the construction of the load cell body, given that the blocks should have a higher modulus than that of the load cell body. In the preferred embodiment, the elastic modulus of the end blocks is preferably at least 50% greater than the elastic modulus of the load cell body.

For example, for an aluminum load cell (with an elastic modulus of about 10 million psi), it has been found that end blocks constructed of steel (with an elastic modulus of about 30 million psi) provide a sufficient increase in the apparent bulk modulus of the load cell body to substantially improve the cornering and rejection of moment induced shears. Similarly, for load cell bodies constructed of various composite materials, it is believed that aluminum or its oxides may be suitable for use as end blocks.

Figure 6:
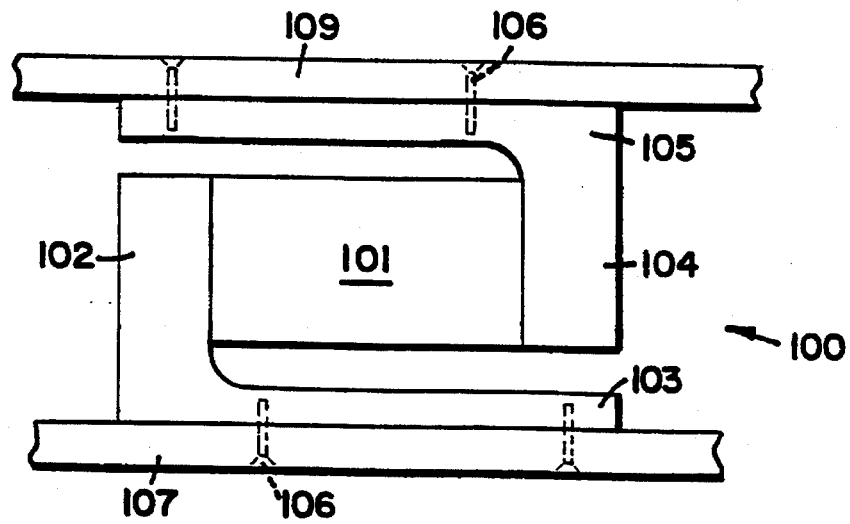
FIG. 6 is a side elevational view of an alternate composite load cell consistent with the invention, including integrally formed mounting brackets.

Several additional modifications may be made to end blocks 60, 62 consistent with the invention. For example, the end blocks may be constructed to be integral with brackets or other supporting or mounting hardware, such as brackets for interconnecting the load cell with the base or platform of a scale. For example, in load cell 100 shown in FIG. 6, end blocks 102 and 104 have integral brackets 103 and 105, respectively, for mounting load cell body 101 between a base 107 and platter 109, e.g., with fasteners 106. For sensing other types of forces, other suitable mounting hardware and other structures may also be used.

In addition, it may be possible to increase the apparent modulus of the end blocks in various known manners, such as by spring loading or clamping the blocks to increase the stiffness thereof. It will be appreciated that other modifications may be made to the preferred end blocks consistent with the invention.

The design of composite load cell 30 provides several advantages. For example, as discussed above, the preferred end block designs provide improved rejection of moment induced shears by increasing the apparent modulus of the end beams of the load cell body. This results in improved resolution for the composite load cell 30. Moreover, the improved rejection of moments may even enable lower modulus materials to be used in load cell bodies where they were previously not usable due to limitations imposed by the inherent properties of the material. For example, it may be possible to use less expensive materials and/or less expensive manufacturing processes to reduce the cost and/or complexity of a composite load cell.

The preferred designs also improve cornering to reject torsional moments due to off-center loads. As described above, many conventional designs require filing or other adjustments to individual flexures on the connecting beams to improve the cornering and correct for transverse or longitudinal moments due to off-center loading. It has been found that the stiffer end blocks also reduce these torsional moments, which may reduce or eliminate the custom adjustment of individual flexures, thereby resulting in lower manufacturing costs and complexity.

Load cell Mounting

Figure 3:
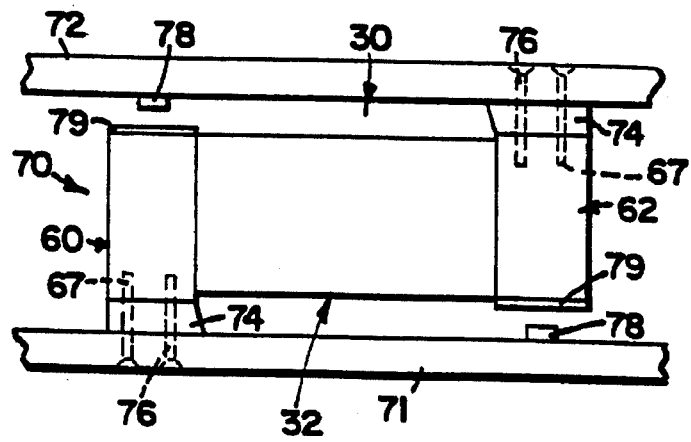
FIG. 3 is a side elevational view of a preferred method of mounting the composite load cell of FIG. 1 for the purposes of measuring weight.

Depending upon the particular application, the preferred composite load cells may be mounted in several ways to detect and generate an output signal representative of the applied force on the load cell. For example, as shown in FIG. 3, composite load cell 30 may be interposed between the base 71 and platter (or force receiving member) 72 of a scale 70 for the purposes of measuring the weight of an object placed upon platter 72. In this embodiment, composite load cell 30 is mounted to base 71 along the bottom surface of end block 60 through a spacer 74. Similarly, composite load cell 30 is mounted to platter 72 with a spacer 74 interposed between the platter and the top surface of end block 62. Spacers 74 are preferably constructed of a shock resistant material such as phenolic to dampen vibrations and protect composite load cell 30 from sudden jarring forces.

As shown in FIG. 1, the interconnection between the end blocks and the scale components may be made through a pair of threaded fasteners 76 which engage threaded apertures 67 formed in each block. Other manners of fastening the end blocks to the platter and base of scale 70 may also be used, such as any of the mechanisms described above for attaching the end blocks to load cell body 32.

As is also shown in FIG. 3, a pair of stops such as bolts 78 or other suitable protruding members may also be affixed to the base 71 and/or the platter 72 to prevent damage to the force sensing structure within load cell 30 due to excessive deflection of the load cell body. In addition, strips 79 constructed of phenolic or a similar material may be installed opposite stops 78 to prevent damage to the load cell. In addition, any suitable brackets or alternative fasteners may be used consistent with the invention.

Figure 4:
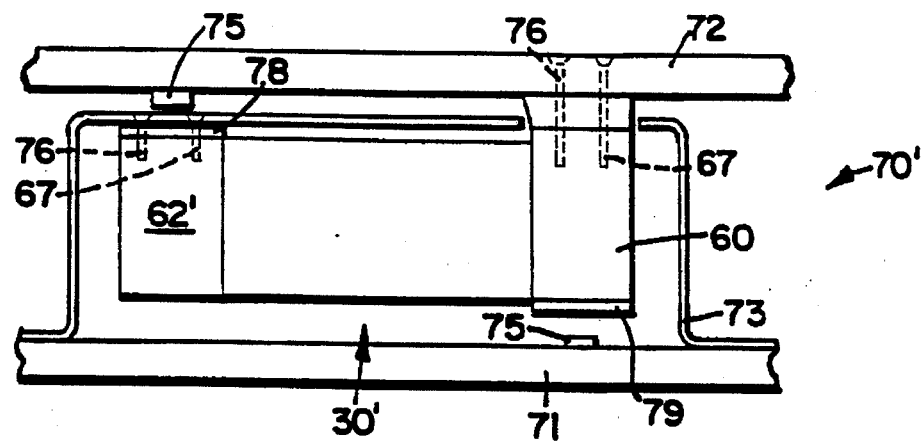
FIG. 4 is a side elevational view of an alternate method of mounting a composite load cell consistent with the invention.

FIG. 4 shows an alternate manner of mounting a load cell 30' in a scale 70'. In this embodiment, apertures 67 are formed in the top surfaces of blocks 60 and 62'. Block 60 is in turn mounted through a spacer 77 to platter 72, while block 62' is mounted to base 71 through a spacer 78 mounted to bracket 73. Both blocks are mounted to their respective members through the use of fasteners 76 engaging the threaded apertures 67 in the blocks. Moreover, bracket 73 includes an aperture for permitting passage of spacer 77 therethrough. Stops 75 and strip 79 may be used to protect the load cell from excessive deflection.

Composite load cell 30 may be mounted in several alternative ways to that shown in FIGS. 3 and 4. For example, load cell 30 may be mounted across the bottom surfaces of blocks 60, 62. Also, load cell 30 may be mounted using the end surfaces of one or both of blocks 60, 62. Moreover, other types of mounting configurations, such as cantilevered or fulcrumed configurations, and other types of force receiving members and other mounting hardware, may also be used, depending upon the particular type of force which is being measured, e.g. pressure, acceleration, weight, torque, etc.

Applications

Composite load cells consistent with the invention may be constructed to measure various forces, such as due to weight, acceleration, torque, pressure, and the like. Moreover, several applications may exist for each category of force. Therefore, it will be appreciated that the use of the preferred composite load cell in a weight sensing environment is provided merely for illustration, and in no way should be construed as limiting the invention.

For example, the preferred load cells may be used in different weighing applications, such as counting scales, laboratory scales, scanning scales, postal scales, etc. One type of scale suitable for use with the preferred load cells is the PC-810 Counting Scale, manufactured by Weigh-Tronix, Inc., the assignee of the present invention.

Figure 7:
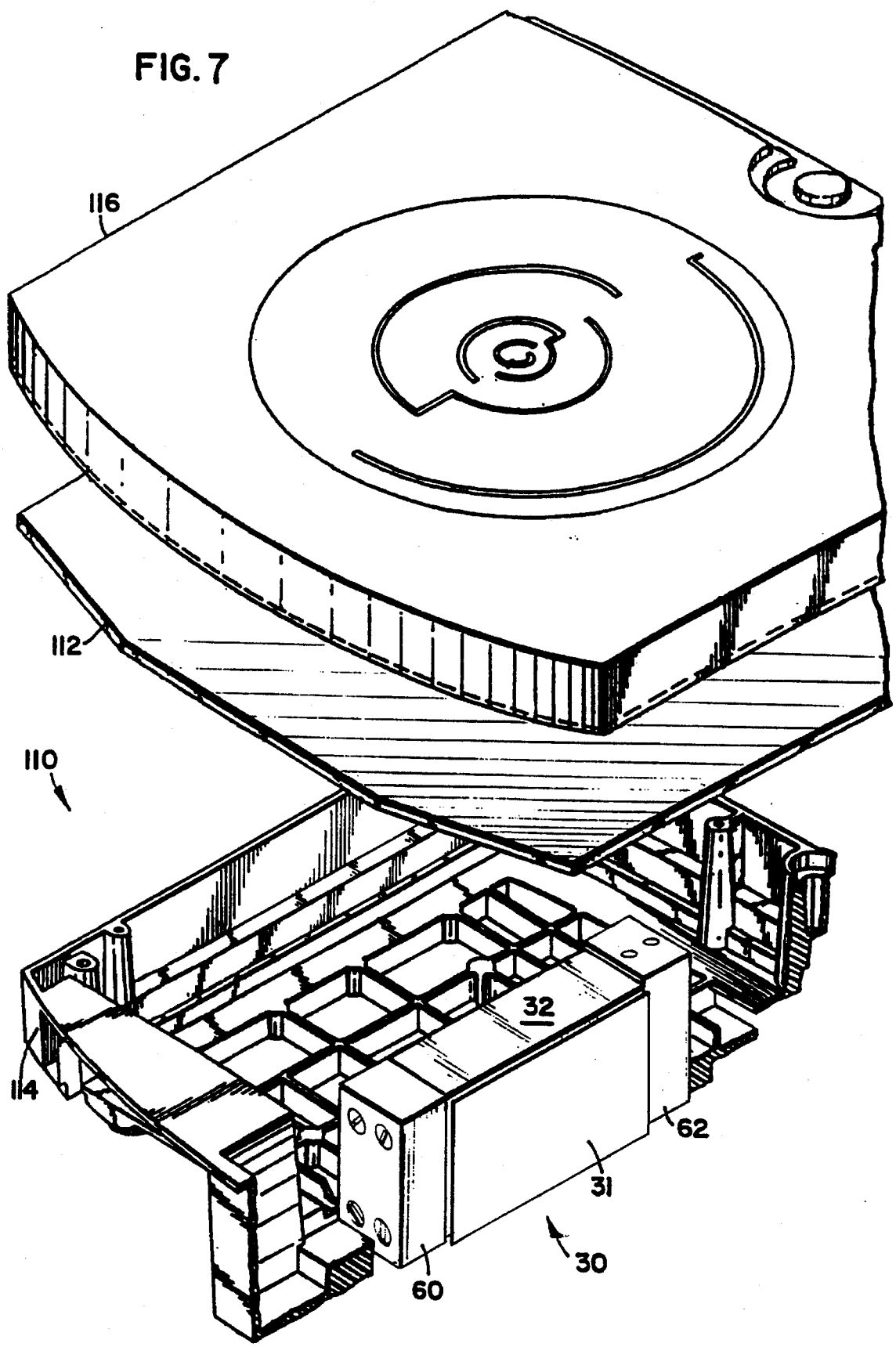
FIG. 7 is an partial exploded fragmentary view of a scale including the composite load cell of FIG. 1.

FIG. 7 shows one preferred scale 110 which includes composite load cell 30 with load cell body 32 mounted between base 114 and platter 112 through end blocks 60, 62. Shroud 116 is disposed over platter 112 for providing a working surface on which objects may be placed for measurement, as well as for ornamental purposes. A load cell controller 31 is also mounted to load cell 30.

The above discussion, examples and embodiments illustrate our current understanding of the invention. However, since many variations of the invention can be made without departing from the spirit and scope of the invention, the invention resides wholly in the claims hereafter appended.

I claim:

1. A force sensing composite load cell, comprising:
    a load cell body including a central portion for receiving a force sensing structure and first and second opposing end beams connected to the central portion, the load cell body formed to deflect in response to an applied force; and
    the first and second opposing end beams comprising a first end beam portion that is part of the load cell body and a second end beam portion, the second end beam portion constructed of a material having an elastic modulus which is at least 50% greater than that of the first end beam portion to form a composite end beam.

2. The load cell of claim 1, further comprising:
    first and second opposing connecting beams; the opposing composite end beams being joined through a plurality of flexures to the first and second opposing connecting beams, and wherein the load cell body further includes a force sensing structure disposed within an interior aperture of the load cell body.

3. The load cell of claim 2, wherein the load cell body is a monolithic structure.

4. The load cell of claim 2, wherein the force sensing structure includes:
    (a) a load beam extending from a wall of the interior aperture;
    (b) a cantilevered beam coupled to and extending generally parallel to the load beam; and
    (c) a force sensor coupled between the load beam and the cantilevered beam.

5. The load cell of claim 4, wherein the force sensing structure further includes a second cantilevered beam coupled to and extending generally parallel to the load beam, and a second force sensor coupled between the load beam and the second cantilevered beam.

6. The load cell of claim 5, wherein the force sensing structure further includes a base disposed on a wall of the interior aperture, and wherein the load beam spans from the base to an opposing wall of the aperture.

7. The load cell of claim 6, wherein the force sensors include double ended tuning fork resonators.

8. The load cell of claim 2, wherein the force sensing structure includes a load beam spanning across the interior aperture and at least one strain gauge disposed on the load beam.

9. The load cell of claim 1, wherein the load cell body includes a metal or metal alloy material.

10. The load cell of claim 1, wherein the load cell body includes a polymer material.

11. The load cell of claim 1, wherein the load cell body includes a composite material.

12. The load cell of claim 1, wherein the first end beam portions of the opposing composite end beams each include an end surface, and wherein the second end beam portions each include a mating surface for mating flush with the end surface of a corresponding first end beam portion of the opposing composite end beam.

13. The load cell of claim 12, wherein the end surfaces and the mating surfaces are generally rectangular in shape, and wherein each mating surface matches up along at least three edges of the end surface of a corresponding opposing composite end beam.

14. The load cell of claim 1, wherein each second end beam portion has a width greater than 50% of the first end beam portion.

15. The load cell of claim 1, wherein the second end beam portion include a metal or metal alloy material.

16. The load cell of claim 1, wherein the second end beam portion include a polymer material.

17. The load cell of claim 1, wherein the second end beam portion include a composite material.

18. The load cell of claim 1, wherein the second end beam portions are steel and the first end beam portions and the load cell body are aluminum or an aluminum oxide.

19. The load cell of claim 1, wherein the second end beam portion include integrally formed mounting brackets.

20. The load cell of claim 1, wherein each second end beam portion is mounted to a first end beam portion with at least one threaded fastener extending through a first aperture disposed in the second end beam portion and engaging a second aperture disposed in the first end beam portion.

21. The load cell of claim 20, wherein the second aperture extends generally perpendicular to an end surface of the first end beam portion.

22. The load cell of claim 1, wherein the second end beam portions are mounted to the first end beam portions by fasteners, welding, or soldering.

23. A force sensing load cell, comprising:
    (a) a load cell body having first and second composite end beams joined by at least one connecting beam, the composite end beams having a relative deflection due to applied force on the load cell body;
    (b) sensing means for sensing shear force applied to the load cell body by the relative deflection of the composite end beams; and (c) the composite end beams comprising a first end beam portion constructed of a material having a first elastic modulus, and a second end beam portion constructed from a material having a second elastic modulus, the second elastic modulus being at least about 50 percent greater than the first modulus; whereby the apparent bulk modulus of the composite end beams is increased.

24. The load cell of claim 23, wherein the load cell body further includes a second connecting beam joined to the first and second end beams, and wherein the sensing means is disposed within an interior aperture of the load cell body.

25. The load cell of claim 24, wherein the sensing means includes:

(a) a base disposed on a wall of the interior aperture;

(b) a load beam spanning from the base to an opposing wall of the interior aperture;

(c) first and second cantilevered beams coupled to and extending generally parallel to the load beam; and (d) first and second force sensors coupled between the load beam and the first and second cantilevered beams, respectively.

26. The load call of claim 25, wherein the force sensors include double ended tuning fork resonators.

27. The load cell of claim 24, wherein the sensing means includes a load beam spanning across the interior aperture having at least one strain gauge.

28. The load cell of claim 23, wherein the load cell body and first end beam portion include a metal or metal alloy material.

29. The load cell of claim 23, wherein the load cell body and first end beam portion include a polymer material.

30. The load cell of claim 23, wherein the load cell body and first end beam portion include a composite material.

31. The load cell of claim 23, wherein the second end beam portion include a metal or metal alloy material.

32. The load cell of claim 23, wherein the second end beam portion include a polymer material.

33. The load cell of claim 23, wherein the second end beam portion include a composite material.

34. The load cell of claim 33, wherein the second end beam portions are steel and the load cell body and the first end beam portions are aluminum or an aluminum oxide.

35. The load cell of claim 23, wherein the composite end beams each include a rectangular end surface, wherein the second end beam portions each include a mating surface which follows the contour of the end surface of a corresponding first end beam portion, the mating surface having a profile that matches up along at least three edges of the end surface of the first end beam portion.

36. The load cell of claim 23, wherein each second end beam portion is mounted to a first end beam portion with at least one threaded fastener extending through a first aperture disposed in the second end beam portion and engaging a second aperture disposed in the first end beam portion, wherein the second aperture extends generally perpendicular to an end surface of the first end beam portion.

37. A scale, comprising:

(a) a base;

(b) a force receiving member formed to receive an applied force;

(c) a force sensing load cell, including:

(1) a monolithic load cell body having an interior aperture defined by first and second composite end beams joined by flexures to first and second connecting beams, the composite end beams having a relative deflection due to applied force on the load cell body and being comparatively stiffer than the connecting beams;

(2) sensing means, disposed within the interior aperture, for sensing effects due to shear force applied to the connecting beams through the relative deflection of the composite end beams, the sensing means including a load beam extending from a wall of the interior aperture, a cantilevered beam coupled to and extending generally parallel to the load beam, and a force sensor coupled between the load beam and the cantilevered beam; and (3) the composite end beams comprising a first end beam portion constructed of a material having a first elastic modulus, and a second end beam portion constructed from a material having a second elastic modulus which is at least 50% greater that the first modulus of the first end beam portions, for increasing the apparent bulk modulus of the composite end beams; and (d) mounting means for mounting the load cell to the base and the force receiving member through the second end beam portions; whereby a force applied to the force receiving member is applied across the load cell.

38. The scale of claim 37, wherein the sensing means further includes a second cantilevered beam coupled to and extending generally parallel to the load beam, and a second force sensor coupled between the load beam and the second cantilevered beam.

39. The scale of claim 38, wherein the force sensors include double ended tuning fork resonators.

40. The scale of claim 37, wherein the mounting means includes means for coupling the base to a bottom surface of the second end beam portion, and means for coupling the force receiving member to a top surface of the other second end beam portion.

41. The scale of claim 37, wherein the mounting means includes:

(a) first coupling means for coupling the force receiving member to a top surface of the second end beam portion;

(b) a bracket coupled to the base and including an aperture for receiving the first coupling means; and (c) a second coupling means for coupling the bracket to a top surface of the other second end beam portion.

42. The scale of claim 37, wherein each second end beam portion is mounted to the base by at least one threaded fastener engaging an aperture in the second end beam portion that extends generally perpendicular to a surface of the second end beam portion.

43. The scale of claim 37, wherein the mounting means further includes first and second spacers, disposed between the second end beam portion and the base, and between the other second end beam portion and the force receiving member, respectively, the spacers including a shock resistant material.

44. The scale of claim 37, wherein the mounting means further includes at least one overload stop, disposed between one of the second end beam portions and the base or the force receiving member, for limiting deflection of the composite load cell.

* * * * *